From United States Patent [19]

Ronco

[11] Patent Number: 4,689,403
[45] Date of Patent: Aug. 25, 1987

[54] DISAZO PIGMENT FROM CONDENSATION OF CARBOXYLIC ACID CHLORIDE WITH 2,5-DICHLORO-1,4-PHENYLENE DIAMINE

[75] Inventor: Karl Ronco, Riehen, Switzerland

[73] Assignee: Ciba-Geigy AG, Basel, Switzerland

[21] Appl. No.: 372,891

[22] Filed: Apr. 29, 1982

Related U.S. Application Data

[63] Continuation-in-part of Ser. No. 324,708, Nov. 24, 1981, abandoned, which is a continuation of Ser. No. 914,827, Jun. 12, 1978, abandoned, which is a continuation of Ser. No. 821,933, Aug. 4, 1977, abandoned, which is a continuation of Ser. No. 576,947, May 12, 1975, abandoned, which is a continuation-in-part of Ser. No. 41,096, May 27, 1970, abandoned, which is a continuation-in-part of Ser. No. 659,041, Aug. 8, 1967, abandoned.

[30] Foreign Application Priority Data

Aug. 15, 1966 [CH] Switzerland .................. 11755/66
Jun. 28, 1967 [CH] Switzerland .................... 9198/67

[51] Int. Cl.$^4$ .................. C09B 35/30; C09B 43/132; D06P 1/44
[52] U.S. Cl. .................. 534/820; 106/19; 106/23; 106/193 P; 106/288 B; 106/288 Q; 106/289; 106/302; 106/304; 106/308 B; 106/308 Q; 523/164; 524/190; 534/591; 534/734; 534/874; 534/887
[58] Field of Search .............. 260/174, 184, 177, 187, 260/188; 534/820; 106/288 Q

[56] References Cited

U.S. PATENT DOCUMENTS 2,888,453 5/1959 Schmid et al. .................. 260/174
3,562,249 2/1971 Schnabel et al. .................. 260/184
4,053,464 10/1977 Rouecht .................. 260/174

FOREIGN PATENT DOCUMENTS 1644111 10/1970 Fed. Rep. of Germany ...... 260/174
1533078 8/1967 France .................. 260/184
1133400 11/1968 United Kingdom .................. 260/174
1143727 2/1969 United Kingdom .................. 260/184

OTHER PUBLICATIONS

Lubs, "The Chemistry of Synthetic Dyes and Pigments", Reinhold Publishing Corp.: New York, 1955, pp. 670 to 671.

*Primary Examiner*—Floyd D. Higel
*Attorney, Agent, or Firm*—Harry Falber

[57] ABSTRACT

The present invention concerns the disazo pigment of the formula

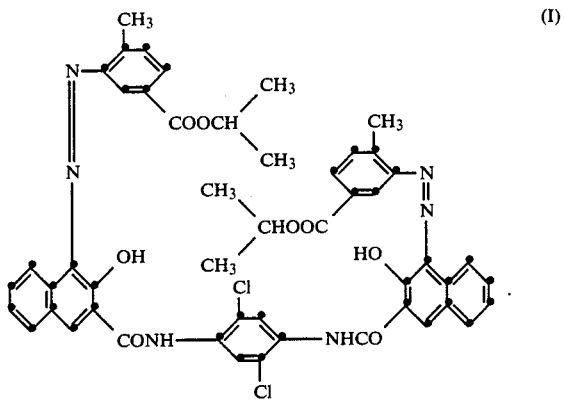

The new pigment is useful for coloring plastic material in pure red shades of high tinctorial strength and outstanding fastness to light and migration.

1 Claim, No Drawings

DISAZO PIGMENT FROM CONDENSATION OF CARBOXYLIC ACID CHLORIDE WITH 2,5-DICHLORO-1,4-PHENYLENE DIAMINE

This application is a continuation-in-part of my application Ser. No. 324,708, filed Nov. 24, 1981, now abandoned, which in turn is a continuation of my application Ser. No. 914,827, filed June 12, 1978, now abandoned, which in turn is a continuation of my application Ser. No. 821,933, filed Aug. 4, 1977, now abandoned, which in turn is a continuation of my application Ser. No. 576,947, filed May 12, 1975, now abandoned, which in turn is a continuation-in-part of my application Ser. No. 41,096, filed May 27, 1970, now abandoned, which in turn is a continuation-in-part of my application Ser. No. 659,041, filed Aug. 8, 1967, now abandoned.

The present invention provides the disazo pigment of the formula

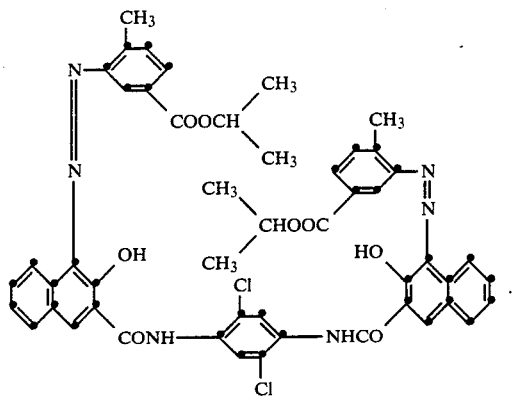

The disazo pigment of formula (I) is a new compound and may be obtained by condensing the carboxylic acid chloride of the formula

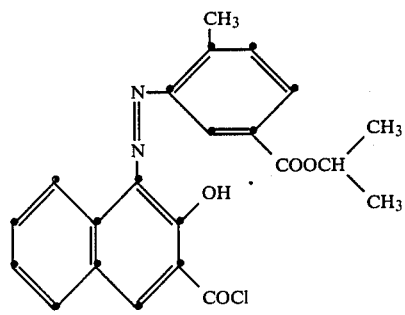

with 2,5-dichloro-1,4-phenylene diamine in a molar ratio of 2:1.

The azo-dyestuff carboxylic acid from which the chloride of the formula (II) is derived may be obtained by coupling the disazo compound of 1-amino-2-methyl-benzene-5-carboxylic acid-isopropyl ester with 2,3-hydroxy naphtoic acid.

The azo carboxylic acid so obtained is treated with thionyl chloride preferably in an inert organic solvent, especially o-dichlorobenzene advantageously in the presence of dimethyl formamide.

The condensation between the carboxylic acid chloride of the formula (II) with the 2,5-dichloro-1,4-phenylene diamine is advantageously carried out in an anhydrous medium in an organic solvent, such as dichlorobenzene at the boiling point of the solvent.

The pigment of the formula (I) can be used for the coloration of compounds of high molecular weight, such as viscose, cellulose ethers, cellulose esters, polyamides, polyurethanes and polyesters, and also in the production of coloured lacquers and lake-formers, and printing inks, aqueous dispersions, solutions or products made from cellulose acetate, nitrocellulose, natural or synthetic resins, for example, polymerization resins, for example, aminoplasts, alkyd resins, phenoplasts and polyolefines, for example, polystyrene; polyvinyl chloride, polyethylene, polypropylene, polyacrylonitrile, rubber, casein, silicons and silicone resins. They may also be used advantageously in the manufacture of coloured pencils, laminated sheet material and for the printing of textile fibers, by means of binders.

The new pigment is distinguished by an excellent tinting strength, dispersability, transparency and resistance against heat. The colorations obtained in the various polymers have a pure and brillant shade, no dichroismus, excellent fastness to light, weathering and migration. Moreover the new pigment is highly useful in admixture with inorganic pigments, such as chrome yellows, iron oxides and molybdate orange.

Compared with the best comparable prior art compound, namely the corresponding dimethyl-ester as described in the Belgian Pat. No. 702,667 which corresponds to the application Ser. No. 659,041, filed May 27, 1970 the claimed compound is distinguished by a better transparency, higher tinting strength and a more brillant shade.

The following Example illustrates the invention. Unless otherwise stated, the parts and percentages are by weight.

EXAMPLE 19.6 parts of the azo dyestuff prepared from diazotized 4-methyl-3-aminobenzoic acid isopropyl ester and 2,3-hydroxy-naphthoic acid are suspended in 100 parts of ortho-dichloro-benzene. 8 parts of thionyl chloride and 0.2 part of dimethylformamide are added to the mixture and the whole is heated for 2 hours at 110° to 120° C. while stirring. The uniformly crystalline compound which precipitates is isolated by filtration when the batch is cold and then washed with a small amount of ortho-dichlorobenzene and benzene. Drying is effected in vacuo at 50° to 60° C. and 17.3 parts of the azo dyestuff carboxylic acid chloride of the formula (II) are obtained.

16.4 parts of the acid chloride so obtained are mixed with 900 parts of ortho-dichlorobenzene and then a hot solution of 3.55 parts of 2,5-dichloro-1,4-phenylene-diamine in 300 parts of ortho-dichlorobenzene is added at 30° C.: The batch is heated to 140° C. while stirring and condensation is carried out for 14 hours at 140° to 145° C. The hot reaction mixture is filtered and the residue is washed successively with hot ortho-dichlorobenzene, methanol and water. It is dried in vacuo at 95° to 100° C. and 16.7 parts of a soft-grained red pigment powder are obtained which colours synthetic materials, for example, polyvinyl chloride, and lacquers brilliant red shades possessing excellent fastness to migration, overstripe bleeding and light.

What is claimed is:
1. The compound of the formula

3
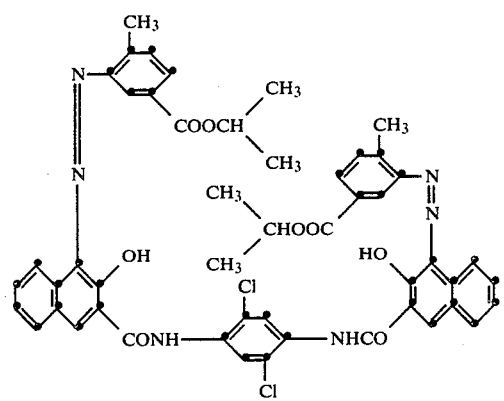
4
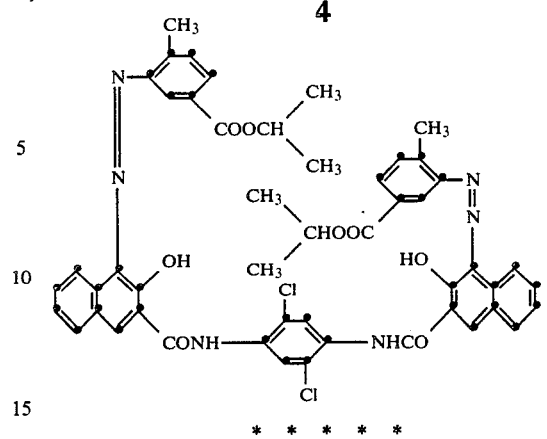
(I)
* * * * *